United States Patent [19]

Ragsdale

[11] 4,455,663
[45] Jun. 19, 1984

[54] FULL DUPLEX MODEMS AND SYNCHRONIZING METHODS AND APPARATUS THEREFOR

[75] Inventor: Robert G. Ragsdale, Hollywood, Fla.

[73] Assignee: Novation, Inc., Chatsworth, Calif.

[21] Appl. No.: 322,927

[22] Filed: Nov. 19, 1981

[51] Int. Cl.³ .............................................. H04B 1/10
[52] U.S. Cl. .................................... 375/98; 375/103; 179/16 A
[58] Field of Search ....................... 375/98, 14, 15, 89, 375/103, 106, 108, 117, 118; 364/724; 179/16 R, 16 A, 170.2; 370/100, 109; 329/110, 118

[56] References Cited

U.S. PATENT DOCUMENTS

| | | | |
|---|---|---|---|
| 3,646,448 | 2/1972 | Harmon, Jr. et al. | 375/98 |
| 3,669,511 | 9/1972 | Motley et al. | 375/15 |
| 4,004,226 | 1/1977 | Qureshi et al. | 375/15 |
| 4,137,427 | 1/1979 | Choquet et al. | 375/118 |
| 4,227,252 | 10/1980 | Godard | 375/118 |
| 4,295,222 | 10/1981 | Van Uffelen | 375/106 |
| 4,312,075 | 1/1982 | Murano et al. | 375/106 |
| 4,344,176 | 8/1982 | Qureshi | 375/15 |
| 4,352,194 | 9/1982 | Caracappa | 378/89 |

Primary Examiner—Robert L. Griffin
Assistant Examiner—Stephen Chin
Attorney, Agent, or Firm—Blakely, Sokoloff, Taylor & Zafman

[57] ABSTRACT

Full duplex modems and synchronizing methods and apparatus therefor which allow the relatively low cost realization of full duplex modems compatible with prior art data sets such as the Bell System 212A Data Set. The modems utilize relatively little bandpass line filtering with post demodulation filters which provide normal filtering of second harmonic products, but further also serving to make up for the lack of the ordinarily heavy line or predemodulation filtering commonly used to reject the other channel. In addition, the automatic gain control is provided after the post demodulation filters rather than on the incoming line itself. Carrier sync and timing error corrections are provided under software control, with timing error corrections being achieved by sensing certain phase differences and providing a correction in response thereto. The use of switched capacitor filters, as well as other techniques herein disclosed, allows the use of two identical large scale integrated circuits to provide most of the transmit and receive functions of the modem.

28 Claims, 10 Drawing Figures

TIMING CORRECTIONS

| $Q_1$ ↓ / $Q_2$ → | 0° | 90° | 180° | 270° |
|---|---|---|---|---|
| 0° | 0 | E2 | 0 | -E2 |
| 90° | E2 | E2 | E2 | 0 |
| 180° | 0 | E2 | 0 | -E2 |
| 270° | -E2 | 0 | -E2 | -E2 |

FULL DUPLEX MODEMS AND SYNCHRONIZING METHODS AND APPARATUS THEREFOR

BACKGROUND OF THE INVENTION

1. Field of the Invention

The present invention relates to the field of modems, i.e., modulator, demodulator sets for digital communication over phone lines, and more particularly, to full duplex modems wherein simultaneous bidirectional communication may be carried out.

2. Prior Art

Various types of modems for digital communication over phone lines are well known in the prior art. For such transmission, base band signals must be modulated so as to carry the information to be communicated in a frequency range within the frequency range of a conventional telephone system. For this purpose, various types of modulation and demodulation techniques are well known to provide for one way communication at any one time (i.e., half duplex) or for simultaneous bidirectional communication, i.e, full duplex operation.

One prior art modem or data set of particular interest to the present invention is the Bell System Data Set 212A, as the preferred embodiment of the present invention is intended for communication compatability with the 212A data set, when communicating with a prior art 212A data set as either the originating or receiving device. (Obviously the present invention is also intended for communicating with another unit in accordance with the present invention, utilizing the standard 212A format). Characteristics of the 212A data set are described in various publications such as, by way of example, the Bell System technical reference entitled "Data Set 212A Interface Specification Jan. 1978", American Telephone and Telegraph Company publication No. 41214.

The 212 data set is basically a bilingual data set, having the capability of transmitting and receiving two kinds of line signals. One of the line signals is a frequency shift keyed format which allows the 212 to communicate with existing 300 baud data sets such as all of the switched network Bell 100 series data sets (this is commented on further in the Detailed Description of the Invention section). Of particular interest herein however, is the 212 data set capability of providing full duplex transmission and reception of serial binary data in a high speed mode at 1200 bits per second. In this mode, multisymbol signaling is used, specifically quaternary phase shift keying (QPSK) is used to transmit 1200 bits per second at a baud rate of 600. QPSK can also be represented as a form of quadrature amplitude modulation (QAM). For this purpose two bits at a time from a serial bit stream are encoded at the rate of 600 symbols per second, and quadrature amplitude modulated using a 1200 Hz carrier for transmission over the phone line from the originating data unit. At the same time the answering unit may be similarly gathering pairs of bits, coding the bit pairs at 600 symbols per second, quadrature amplitude modulating the coded signals using a 2400 Hz carrier and transmitting that information over the phone line from the answering unit to the originating unit. In this sense, the "originating" unit is the unit which initiates the establishment of the communication link over the phone line, and in accordance with the 212 format, sends at 1200 Hz and receives at 2400 Hz, whereas the other or answering unit receives at 1200 Hz and transmits at 2400 Hz. Each unit, of course, contains both a transmitter and a receiver, each capable of operating on either a 1200 or 2400 Hz carrier.

For detection of the received signal, the quadrature amplitude modulated signal must be demodulated by a synchronous demodulator, and since the transmitted signal is in effect a double sideband suppressed carrier signal, the carrier (1200 or 2400 Hz, as the case may be) must be reconstructed at the detector from the signal being received over the phone line. Further, the demodulated signal must be sampled at the rate of 600 samples per second at a rate phased to properly track and decode the data in the received signal. Obviously, methods are known in the prior art for recreating the carrier and establishing timing, though performance, cost and size can be substantially affected by the method and apparatus employed for this purpose.

In prior art 212 data sets both the transmitter and receiver portion of each unit generally may be characterized as having a large amount of channel filtering to remove both data signals from the other data band and as much noise outside the frequency range of interest as possible so that the output of the channel filters will be substantially composed of the modulated signal of interest. Two bandpass filters are normally used for these purposes, each typically 20th order pole filters of substantial cost and complexity. In the receiver the filtered signal is typically applied to an automatic gain control circuit to establish a predetermined signal level for demodulation by the synchronous demodulators. The outputs of the sine and cosine demodulators are then again relatively heavily filtered, partially for wave shaping and partially for removal of the extraneous frequencies introduced by the demodulation process itself. Thereafter the signal is sampled at the 600 sample per second rate and the transmitted bits are reconstructed, the carrier being reconstructed and timing established by various methods depending upon the particular data set. With this general form of construction, 212A data sets heretofore have been relatively large and expensive, and for these reasons have not yet been widely used in the presently burgeoning personal computer market, even though such use may be expected to greatly expand the usefulness of personal computers by giving them communication capabilities with large mainframes and data bases.

BRIEF SUMMARY OF THE INVENTION

Full duplex modems and synchronizing methods and apparatus therefor which allow the relatively low cost realization of full duplex modems compatible with prior art data sets such as the Bell System 212A Data Set. The modems utilize relatively little bandpass line filtering with post demodulation filters which provide normal filtering of second harmonic products, but further also serving to make up for the lack of the ordinarily heavy line or predemodulation filtering commonly used to reject the other channel. In addition, the automatic gain control is provided after the post demodulation filter rather than on the incoming line itself. Carrier sync and timing error corrections are provided under software control, with timing error corrections being achieved by sensing certain phase differences and providing a correction in response thereto. The use of switched capacitor filters, as well as other techniques herein disclosed, allows the use of two identical large scale integrated circuits to provide most of the transmit and receive functions of the modem.

DETAILED DESCRIPTION OF THE INVENTION

Figure 1:
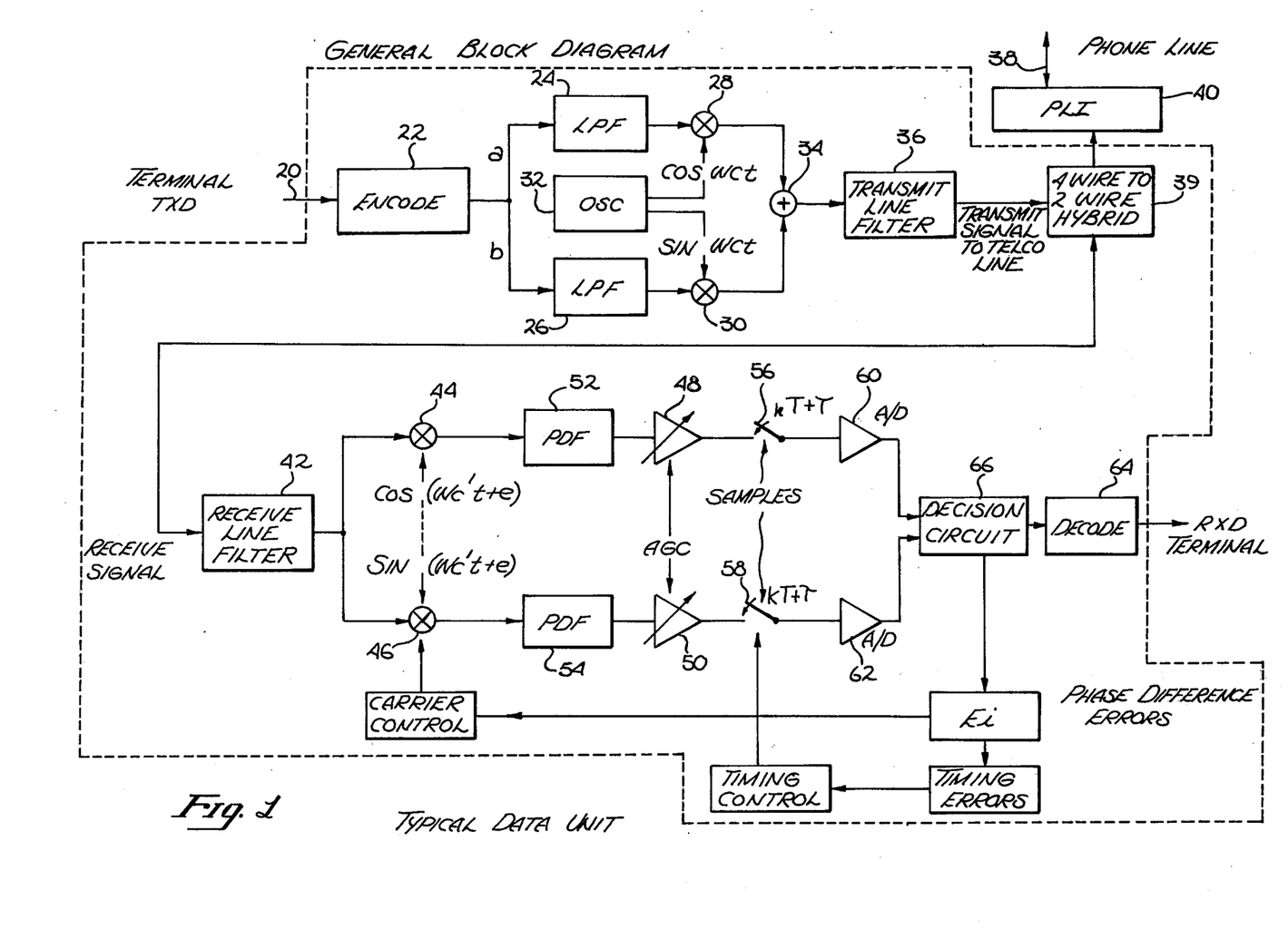
FIG. 1 is a block diagram of a data unit in accordance with the preferred embodiment of the present.

First referring to FIG. 1, a block diagram illustrating a typical data unit in accordance with the present invention may be seen. As previously mentioned, a data unit in accordance with the 212 data set has both a transmit capability, the block diagram for which function is shown in the upper portion of FIG. 1, and a receive capability, the block diagram for which is shown in the lower portion of FIG. 1, the difference between the originating data set and the answering data set being simply the carrier frequency for transmit and receive. Thus, as may be seen in FIG. 1, the carrier for the transmit function is designated $\omega_c$, whereas the carrier for the receive function is identified as $\omega_c'$, thereby indicating that these two carriers are different carriers, i.e., one being 1200 Hz and the other being 2400 Hz.

As shown in the upper portion of FIG. 1, a serial line 20 from a terminal or other data device provides a serial bitstream for the data to be transmitted, such lines normally being referred to as the transmit data or TXD line. The input on line 20 is provided to an encoder 22 which, in accordance with the quatenary phase shift keying scheme of the 212, successively gathers adjacent pairs of bits in the data stream to encode the pair at the rate of 1200 bits per second, or 600 pairs per second to provide the outputs a,b to low pass filters 24 and 26. The outputs of the low pass filters 24 and 26 are modulated by modulators 28 and 30, using reference frequencies of $\cos \omega_c t$ and $\sin \omega_c t$, respectively, generated by oscillator 32. The coding used generates the QPSK signal constellation shown in FIG. 2. The frequency of oscillator 32 will be either 1200 Hz or 2400 Hz, depending upon whether the data unit under consideration is the originating data unit or the answering data unit, and thus is nominally 2 or 4 times the signaling or baud rate of the output of encoder 22. However, the output rate of encoder 22, i.e., 600 signal pairs per second, is generally not locked to oscillator 32, so that the receiving portion of the other data set must reconstruct not only the carrier $\omega_c$ for demodulation of the receive signal, but must also essentially reconstruct the timing of the signals a,b for appropriate sampling of the corresponding received and demodulated signal pair.

The outputs of the modulators 28 and 30 are summed at a summing point 34, filtered by line filter 36 to remove the higher frequencies imposed by the modulation process, and coupled to the phone line 38 through a 4 wire to 2 wire hybrid circuit 39 and then a phone line interface 40. It will be noted that the hybrid and phone line interface is shown outside of the dashed line enclosing the data unit, as that configuration is consistent with the more detailed disclosure to follow herein. However, a typical 212 data unit will have some form of hybrid and phone line interface associated therewith, normally contained within the same enclosure for a self contained data unit.

Figures 2, 5, 6, 7:
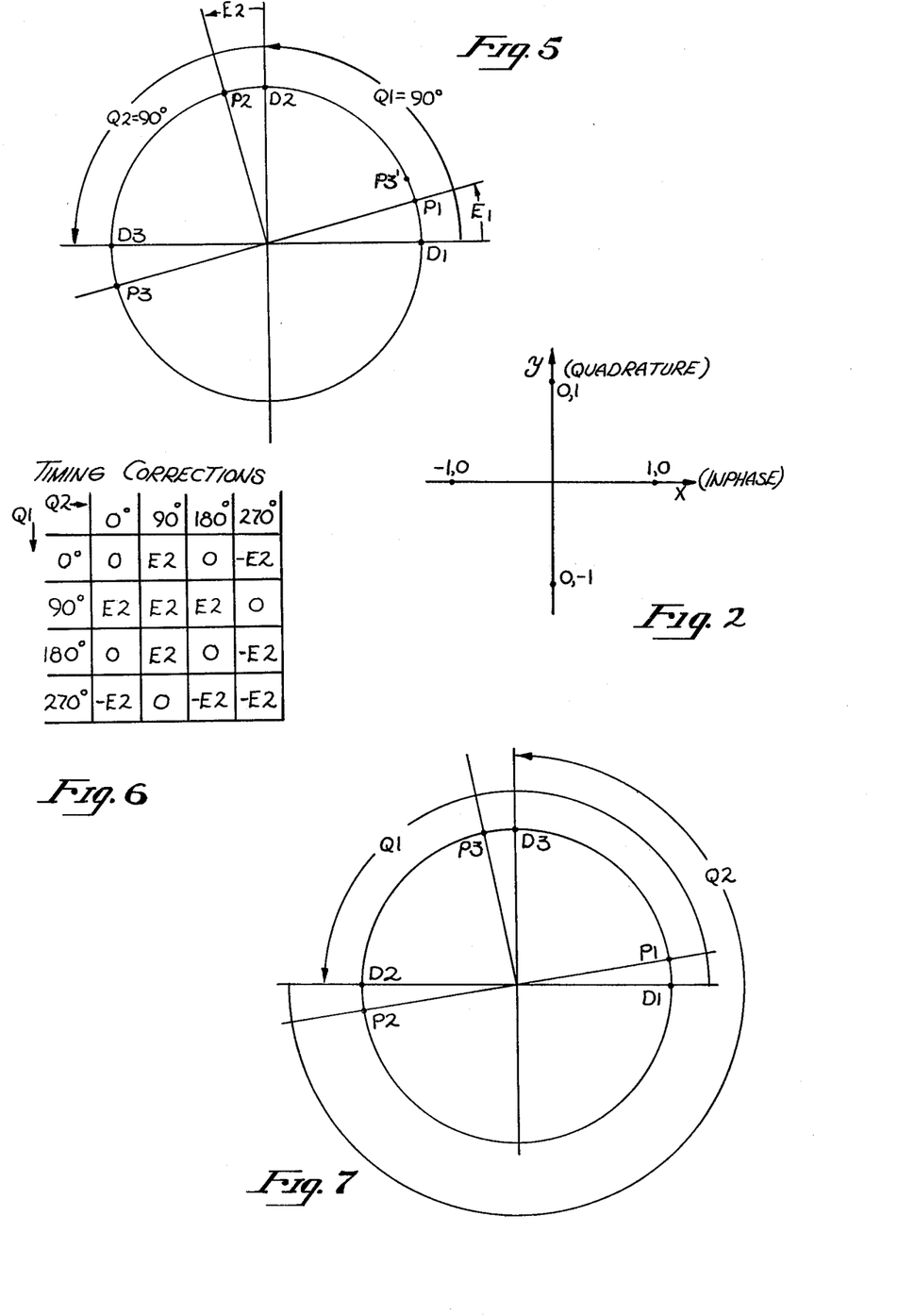
FIG. 2 is a typical signal constellation used in full duplex modems.
FIGS. 5 and 7 are signal constellation diagrams illustrating various positions of three successive data points in the constellation.
FIG. 6 is a chart of the timing corrections used with the present invention.

A signal set or pair a,b obviously may have one of four states, which four states represent all of the possible combinations of the two possible states of each of the two bits of data mapped into signals a and b. Note from FIG. 2 however, that the signal pairs a,b are not merely the two bits grouped as the signal pair, but as shown in the constellation of FIG. 2, the coding is such that a and b each have three possible states, i.e., 1, 0 and $-1$, with the four states of the signal pair a,b used for signaling being (1,0) (0,1) ($-1$,0) and (0,$-1$).

The receiver portion of the data unit is shown in the lower portion of FIG. 1. The incoming signal from the phone line 38 is applied to the phone line interface to a receive line filter 42, the single output of which is simultaneously applied to the cosine and sine demodulators 44 and 46 respectively. The receive line filter 42 in the preferred embodiment is actually comprised of 2 filters, one being a second order active filter and the other being a fourth order switched capacitor filter, making receive line filter 42 an overall sixth order filter. This is to be compared to prior art 212 data sets wherein the corresponding line filter typically is on the order of a 20 pole filter. Further, of course, in prior art 212 data sets, the output of the equivalent of receive line filter 42 is then applied to an AGC circuit to provide automatic gain control, setting fixed signal amplitudes for the rest of the detection system. In the present invention however, the cosine and sine demodulation is done by demodulators 44 and 46 on the output of receive line filter 42, with the automatic gain control function being done by gain controlled amplifiers 48 and 50, after post demodulation filtering of filters 52 and 54. The placement of the automatic gain control function after the post demodulation filtering and the absence of the heavy line filtering characteristic of prior art 212 data sets is enabled primarily by the fact that the post demodulation filters 52 are switched capacitor filters having a very broad dynamic range, so that the post demodulation filters 52 and 54 may be used to filter out the frequencies imposed by the demodulation itself as well as to reject frequencies in the transmission band of the same data set during full duplex operation. In that regard, the post demodulation filters 52 and 54 used with the preferred embodiment of the present invention are of the same approximate order as the post demodulation filters used with the prior art data sets. Thus the complexity of the total filtering of the signals is very substantially less than in prior art 212 data sets, with the switched capacitor filters having further advantages of very small size (realized in integrated circuit form) and relatively low cost, so that the overall data set may be substantially smaller and lower cost than heretofore achieved.

The output of AGC amplifiers 48 and 50 represent signals resembling the outputs of the equivalent of low pass filters 24 and 26 in the other data set transmitting the signal being received, with certain very definite limitations. In particular, the outputs of AGC amplifiers 48 and 50 will resemble the stated signals, distorted however by band width limitations, pulse shaping and equalization of the various filters, lines, demodulators, etc., and further degraded by noise and other line and system characteristics. Thus, as is characteristic of 212 data sets, the outputs of amplifiers 48 and 50 are sampled by samplers 56 and 58 at the 600 baud rate with a timing set by estimator 66 to most likely sample the signals at a time the received data is valid. Considering the signal constellation of FIG. 2, pairs of sampled signals are read out to the decision circuit at the 600 baud rate, to be then converted by the decoder to 1200 bit per second data. The decision circuit 66 provides both the data estimates and a measure of phase errors, which are used to control the carrier used in the demodulator and also to control timing of the samplers.

If desired, the automatic gain control function can be carried out after the sampling. This is illustrated in FIG. 8 wherein the samplers 56' and 58' preceed the AGC amplifiers 48' and 50'.

The present invention may be configured in a number of ways, depending upon the specific application thereof. However, in order to provide greater specificity to the detailed description to follow, a configuration intended for use with Apple II Computers, manufactured by Apple Computer, Inc., will be described. In particular, FIG. 3 presents a detailed circuit diagram for the portion of the modem encircled by the dashed line of FIG. 1. The particular embodiment shown in FIG. 3 is intended for use with a low speed frequency shift keyed modem manufactured and sold by Novation, Inc., assignee of the present invention. That low speed modem has become known as the Apple-CAT CAT II, being a registered trademark of Apple Computer, Inc. and "CAT" being a registered trademark of Novation, Inc. That low speed modem, of course, includes an appropriate phone line interface and accordingly, for that reason, the phone line interface 40 (FIG. 1) was shown outside of the dashed enclosure and of course the circuit of FIG. 3 does not include such an interface. Further, it will be noted in the circuit of FIG. 3 that that circuit connects to the Apple bus through the J2 connector, and to the Apple CAT II through the J1 connector. In this manner, the modem of FIG. 3 is effectively made bilingual as is the 212A data set by the low speed modem responding to the frequency shift keyed signals if that is what is being received, or enabling the circuit of FIG. 3 through pin 17 of J1 by a 212EN signal.

Figure 3A:
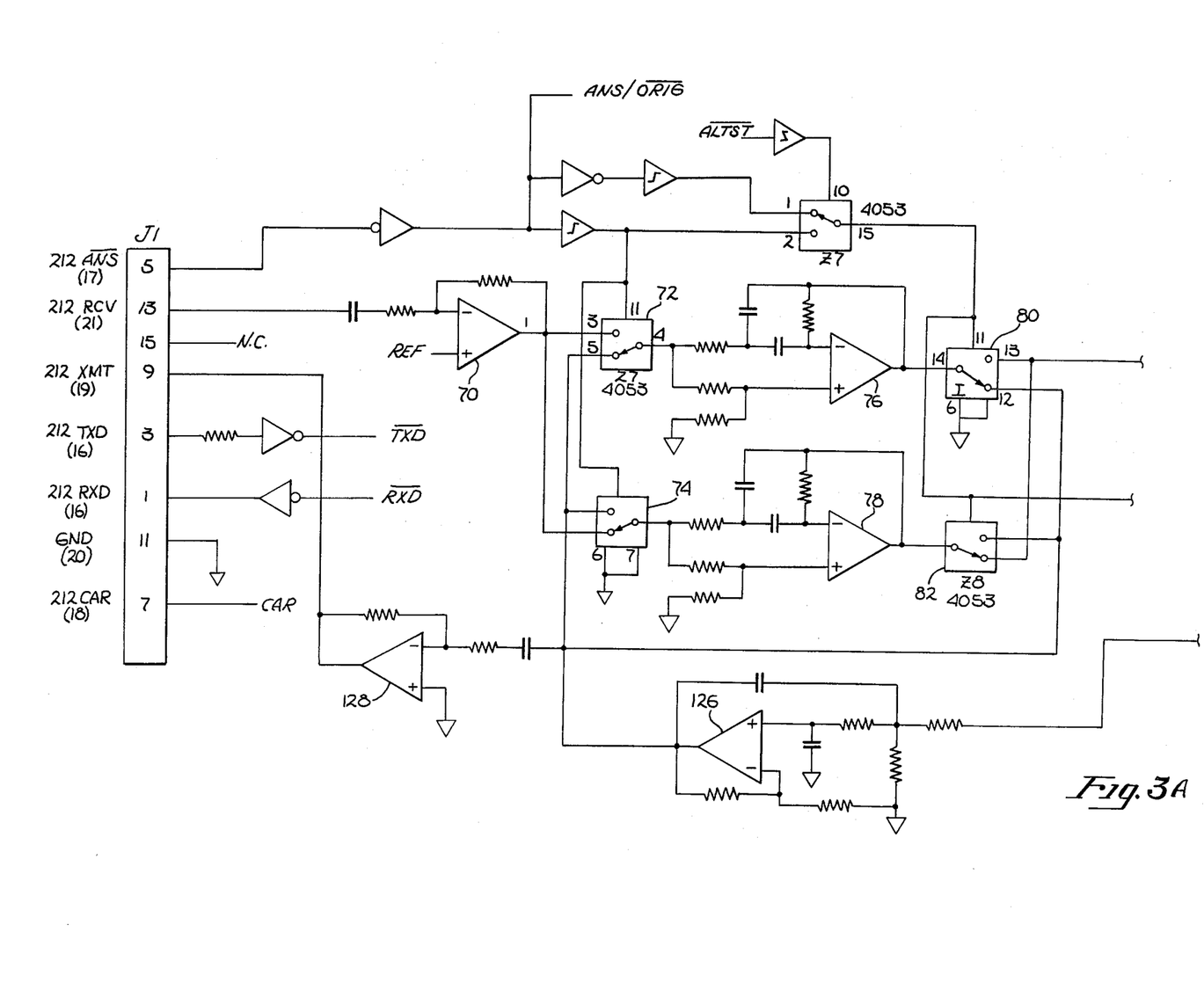
FIG. 3 is a detailed circuit diagram of the data unit shown in block diagram in FIG. 1.
Figure 3B:
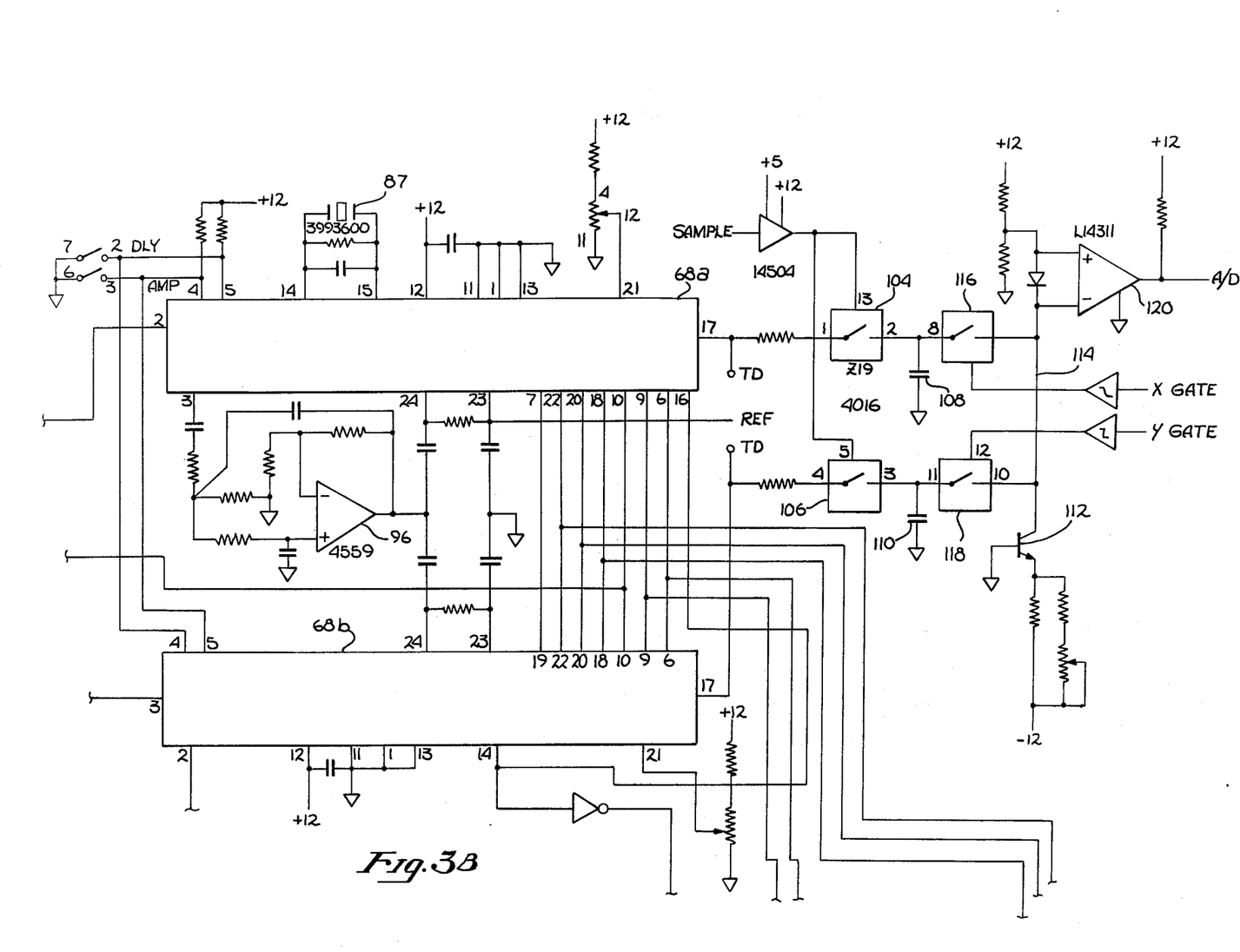
Figures 3C, 8:
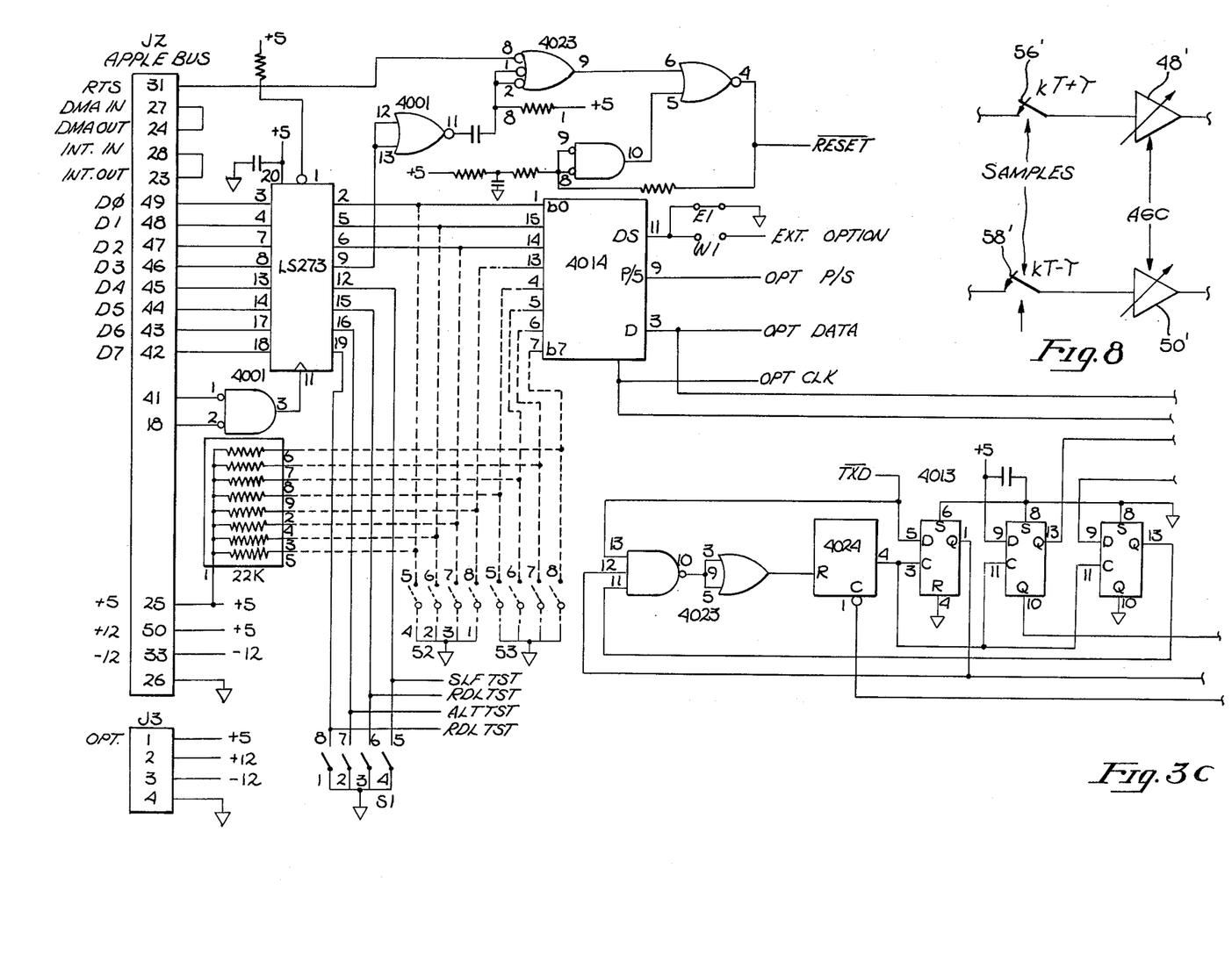
FIG. 8 is an alternate block diagram of the sampling circuit of FIG. 1.
Figure 3D:
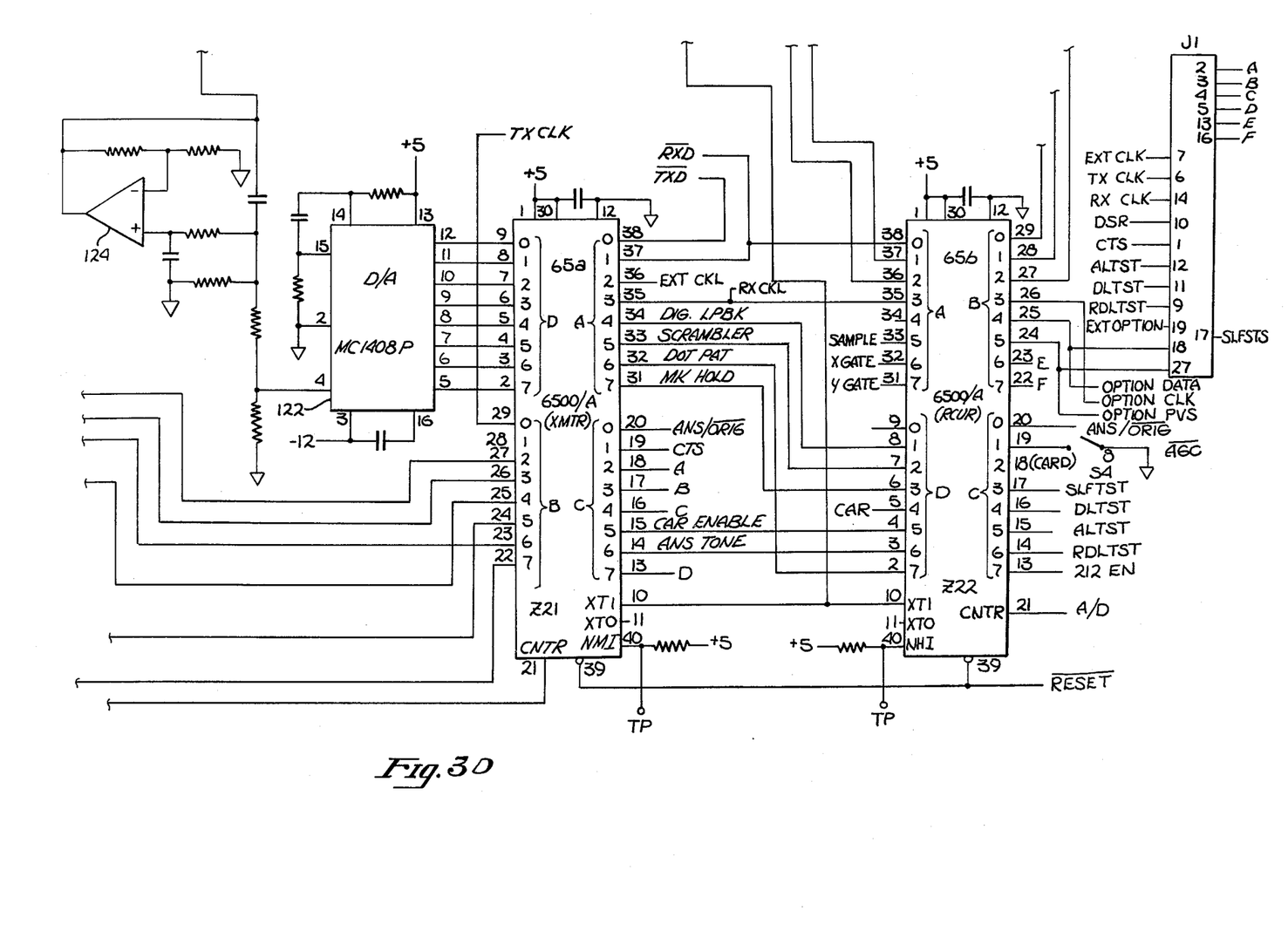

The circuit of FIG. 3 has been broken into four sections because of the complexity thereof, specifically FIGS. 3A through D. For clarity, the four circuit segments have been drawn on the same scale and may be joined to form one overall circuit, with FIG. 3A representing the upper left portion, FIG. 3B the upper right portion, FIG. 3C the lower left portion, and FIG. 3D the lower right portion.

As may be seen in FIG. 3, the heart of the modem is comprised of two custom ICs 68a and 68b, and two 6500/1 microprocessors 65a and 65b. The custom ICs perform a number of functions which will be described in detail, the circuits of which perform relatively straight forward functions though have been put in IC form for cost and size considerations. Of particular interest is the manner of control of the integrated circuits through the pair of 6500/1 single chip computers. The 6500/1 contains a 2048×8 mask programmable read only memory for program storage, a 64×8 static RAM, 32 bidirectional TTL compatible I/O Lines organized into four ports A, B, C and D, and of course also includes various other lines, the nature and function of which are well documented by the manufacturers thereof, such as Rockwell International Corporation (i.e., their R6500/1 one chip microcomputer.)

The primary inputs to the circuit of FIG. 3 are through the J1 connector, as the primary connections through the Apple bus are for power, $\overline{\text{RES}}$ and the control of various options not important to the basic operation of the invention. The primary inputs through the J1 connector include 212 $\overline{\text{ANS}}$ to set the circuit to operate as the originating modem or the receiving modem, 212 RCV which is the phone line input to the receiver portion of the circuit, 212 XMT which is the phone line output of the transmit portion of the circuit, 212 RCV and 212 XMT being the modulated signals, 212 TXD which is the base band binary bit stream to be modulated by the modem, 212 RXD which is the base band digital bit stream resulting from the demodulation and decoding of the 212 RCV signal, and 212 EN which is the basic enable signal for the modem.

The receive signal on the phone line, if a 212 signal rather than a 103 compatible signal to be detected by the Apple-CAT, will be inputted to the circuit of FIG. 3 as the 212 RCV signal, being buffered by amplifier 70 and applied to the inputs of switches 72 and 74. Amplifier 76 is coupled to the output of switch 72 to provide a second order notch filter at 1200 Hz, with amplifier 78 being coupled to the output of switch 74 to provide a second order notch filter at 2400 Hz. It will be noted that the output of amplifier 70 is connected to switches 72 and 74 so as to couple the 212 RCV signal to either the 1200 Hz notch filter or the 2400 Hz notch filter, depending upon the state of the switches. These switches are controlled by the 212 $\overline{\text{ANS}}$ signal, which signal is set dependent upon whether the data unit is in the originate or receive mode. With the state of the switches as shown in FIG. 3, the unit is in the receive mode and thus is receiving at 1200 Hz. The 212 RCV signal therefore is coupled through the lower notch filter. Switches 80 and 82 also coupled by the 212 $\overline{\text{ANS}}$ to select the output of the notch filter being used for the receive signal to provide that signal to pin two of IC 68a. The purpose of the notch filters of course is to substantially reduce the cross talk in the 212 RCV signal from the much larger 212 XMT signal being simultaneously transmitted on the same line.

Figure 4:
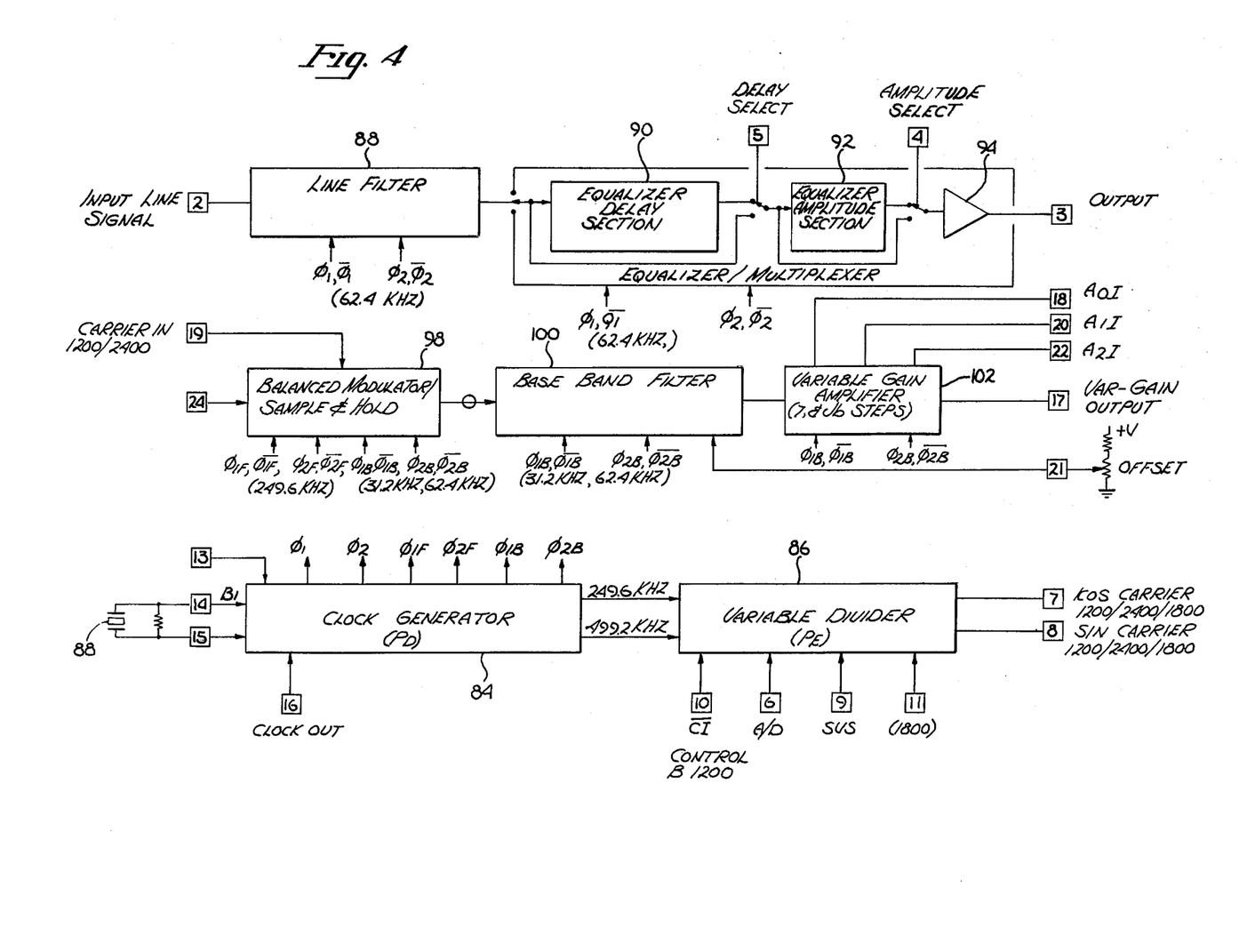
FIG. 4 is a detailed block diagram of each of the integrated circuits 68a and 68b of FIG. 3.

The circuit for each of the ICs, 68A and 68B (the two ICs being identical), may be seen in FIG. 4. Each IC has a clock generator 84 for generating various clock signals (and their inverses, not shown) for controlling various switched capacitor circuits to be described. The clock generator 84 also puts out a 249.6 KHz signal and a 499.2 KHZ signal to a variable divider 86. The clock generators 84 may be controlled either by a 3.4936 MHz crystal 88 as is IC 68a in FIG. 3, or from the output of another similar chip on pin 16, as is IC 68b in FIG. 3.

The purpose of the variable divider 86 is to provide 1200 and 2400 Hz signals out on pins 7 and 8, dependent upon the control provided to the variable divider. One such control is a control applied through pin 10 to determine whether pin 7 provides the 1200 Hz and pin 8 the 2400 Hz, or pin 7 the 2400 Hz and pin 8 the 1200 Hz. In addition however, it is to be noted that the variable divider is driven by a reference determined by the clock generator 84 from crystal 87, whereas the 1200 and 2400 Hz carriers must be capable of being synchronized to the received signal. For this purpose the dividing ratio of divider 86 may be controlled by signals on pins 6 and 9, pin 6 adding counts to the divider to lower the carrier outputs and pin 9 subtracting counts from the divider to raise the frequency of the carrier outputs. In this manner, of course, both frequency and phase of the carriers on pins 7 and 8 may be controlled, as phase may be controlled by a momentary step in the ratio and frequency may be controlled by a persistent change in the ratio.

The input on pin 2 of each IC is applied to a switched capacitor line filter 88, which in the preferred embodiment is a four pole filter. The output of this filter is then normally applied to an equalizer delay section 90 and then to an equalizer amplitude section 92, subsequently being buffered by amplifier 94 for output on pin 3. Amplitude and delay equalizers, of course, are well known in the prior art, these particular equalizers in the preferred embodiment being realized in integrated switched capacitor form. The equalizers are generally determined by predicted characteristics of the phone line, though each of the equalizers may be individually bypassed by separate controls on lines 4 and 5. Thus the output on pin 3 is merely the filtered and equalized 212 RCV signal. Referring again to FIG. 3, it may be seen that this signal is applied to amplifier 96 coupled as a low pass filter, with the output of the filter being coupled to pins 24 of both of the ICs 68a and 68b.

As may be seen in FIG. 4, pin 24 of each IC is an input to a balanced modulator 98 utilizing as the carrier signal the input applied to pin 19. It may be seen from FIG. 3 that pin 19 of IC 68b is coupled to pin 7 of IC 68a and thus the input on pin 24 of IC 68b is the cosine carrier, whereas IC 68a is operative on the sine carrier. The demodulated outputs in each IC from the balanced modulators 98 are filtered by a switched capacitor base band filter 100, with an offset adjustment thereof being available through pin 4. Thereafter each demodulated and filtered output is applied to a variable gain amplifier 102 controlled in seven 4 db steps through binary coded signals on lines 18, 20 and 22. Thus it may be seen that the gain control is provided not on the fundamental input signal, but only after line filtering, demodulation and base band filtering.

The outputs of the AGC sections of the two ICs on pins 17 thereof are applied to a pair of switches 104 and 106, controlled by a SAMPLE signal, a 600 pulses per second signal made synchronous with and appropriately timed with respect to the signaling rate (in a manner yet to be described). This provides a simultaneous sample and hold of the sine and cosine signals on capacitors 108 and 110 at the signaling rate.

As may be seen in FIG. 3, transistor 112 is coupled to provide a constant current sink on line 114. Switches 116 and 118, controlled by XGATE and YGATE signals respectively, may be successively used to connect capacitors 108 and 110 to line 14. When one of the capacitors, say capacitor 108 is coupled to line 114 through switch 116, the voltage of the capacitor will pull negative input of amplifier 120 high, creating a low output signal A/D. The current sink however, will discharge the capacitor at a constant rate, with the net effect that the negative input to amplifier 120 will go negative with respect to the positive input at a time dependent upon the initial sampled charge on the capacitor. Thus the microprocessors, specifically microprocesser 65b, may effectively sense the sample voltages on capacitors 108 and 110 for each sample of the IC outputs through switches 104 and 106 by successively enabling switch 116, measuring the time required for the transition of the signal A/D, disabling switch 116 and repeating the measurement sequence for capacitor 110 through switch 118.

The time for the two A/D signals to change state on each SAMPLE will depend upon the relatively instantaneous output voltage of the variable gain amplifier of the respective channel at the time of occurrance of the SAMPLE signal, which voltage of course will be sensitive to the phase of the carrier used for demodulation and the timing of the SAMPLE signal applied to switches 104 and 106. Referring again momentarily to the signal constellation of FIG. 2, if we consider switch 104 to be sampling the X channel, it will be noted from the signal constellation that three signaling values are used (1, 0, −1). A sample voltage on capacitor 108 representing a relatively high voltage will provide a relatively long delay in the transition in time for the signal A/D when capacitor 108 is sampled through switch 116. A relatively low voltage, corresponding to the −1 state, will give a relatively quick transition for the signal A/D, and finally a midrange time delay will result for the transition of the signal A/D for a sampled voltage corresponding to the zero state. The bias control through pin 21 of the ICs is for the purposes of providing adjustment, and thus close control of the midrange output representing the "zero" level of that channel. Thus it may be seen that the microprocessor, by successively testing the transition times of the output of the amplifier or comparitor 120 at the rate of 1200 samples per second, the outputs of the two channels, sampled simultaneously at 600 samples per second, are directly measured. The measured times are directly used by the microprocessor to decode the receive data and provide the data output signal $\overline{RXD}$, which in turn is inverted to provide the 212 $\overline{RXD}$ signal output on the J1 connector. In addition however, in a manner to be now described, the measured times are also used to establish the timing of the SAMPLE signal and to control the carrier to lock the carrier onto the received signals.

The method of controling the sampling time and the carrier recovery in the receiving portion of a data unit is a very important aspect of the present invention. The method may be described with reference to FIGS. 5, 6 and 7 and the following equations:

$Q2=D3-D2=$Phase difference between points 3 and 2 ($Q2=0°, 90°, 180°$ or $270°$)
$E2=P2-D2=$Phase difference error for point P2
$Q1=D2-D1=$Phase difference between points 2 and 1 ($Q1=0°, 90°, 180°$ or $270°$)

At the outset, assume that the carrier is fundamentally locked on the received signal and that rough timing has been established. Assume further that three successive signal points P1, P2 and P3 are in the positions shown in the signal constellation of FIG. 5 and have been interpreted as data points D1, D2 and D3 by their proximity to the adjacent axis. Each successive sample point, of course, is known to the microprocessor by the A/D times of the x and y channels. By way of example, for point P1, the x channel time of the A/D signal is at or very near the maximum, whereas the A/D time of the y channel for point P1 is near, but slightly greater than the midvalue. The phase errors E1 and E2, shown in FIG. 5, represent the angular deviation of the respective data points P1 and P2 from the nearest axis. Obviously, for small angle approximations that error for P1 may be considered to be the y value and the error for P2 to be the x value (minus in FIG. 5). These errors may be due to errors in the sampling time, or in the carrier phase, or both. In the preferred embodiment, each error En is used to make an incremental correction in the carrier phase in response thereto. As shall be subsequently shown, some of the errors En will be due to timing errors and as a result, may in fact cause an incremental carrier phase correction in the wrong direction. However, any single incremental carrier phase correction is relatively small and in itself will not disturb the system, so long as on a statistical basis the carrier phase corrections in the proper direction substantially outnumber those in the wrong direction. This is the case for the present invention, and in fact carrier sync (both phase and frequency) is readily obtained during the initialization process of the signaling. In effect, carrier tracking is achieved in a phase locked loop, realized in software and making the phase corrections as stated on each sample point.

In addition, the sample points are used for timing corrections in accordance with the chart of FIG. 6 which in the preferred embodiment, is implimented as a simple lookup table permanently stored in read-only memory. As may be seen from the foregoing equations and as shown in FIG. 5, the phase difference Q1 represents the phase difference (in 90 degree increments) between data points P2 and P1 (a phase difference of −90 degrees is considered as a phase difference of +270 degrees). Similarly the phase difference Q2 for data points P2 and P3 is the angle of data point P3 minus the angle of data point P2. In the example shown in FIG. 5, both Q1 and Q2 are 90 degrees. If, on the other hand, data point P3 was at the position of point P3', Q1 would of course still be 90 degrees, but Q2 would be 270 degrees.

Depending upon the relative positions of points P1, P2 and P3, incremental timing error corrections will be made in accordance with the chart of FIG. 6. By way of specific example, for the points P1, P2 and P3 shown in FIG. 5, Q1=90 degrees and Q2=90 degrees. Accordingly an incremental timing error correction will be made with the polarity of E2, i.e., since the angular error of E2 is positive, the timing will be advanced. If, on the other hand, P1 is 90 degrees as shown, but the third data point P3 is at the position of P3' so that Q2 is 270 degrees, no timing correction is indicated in FIG. 6. This does not necessarily mean that the timing is correct, but as shall be subsequently described, the sign of the timing error cannot be determined and accordingly, the direction of the appropriate correction could not be determined.

If on the other hand, the signal constellation for three successive points P1, P2 and P3 is as shown in FIG. 7, the phase difference Q1 is 180 degrees and the phase difference Q2 is 270 degrees. In this case the timing correction to be applied is in the opposite direction of the phase difference error E2, i.e., if the phase difference error E2 is in a positive direction the timing should be incrementally retarded, and if the phase difference error E2 is in the negative direction, the timing should be advanced.

The logic of the chart of FIG. 6 may be explained in a number of different ways. In particular, if any three successive points P1, P2 and P3 fall at the same position or simply represent excursions on a single axis, the direction of the timing error cannot be determined. Accordingly, it will be noted in FIG. 6 that the four combinations of zero and 180 degrees give rise to no timing correction. Further, if for any three successive points the third point falls at substantially the same position as the first point so that Q2 effectively retraces Q1, the direction of the timing error cannot be determined and accordingly, no correction is made. This explains the absence of any timing correction in FIG. 6 for the 90–270 and the 270–90 points. With respect to the values of Q1 and Q2 which give rise to error correction, perhaps the easiest to visualize is the sequence illustrated with respect to FIG. 5, wherein both Q1 and Q2 are 90 degrees. There the error E2 may be seen to be an error in the x axis reading, i.e., a negative x axis reading when ideally a zero should have been read. Further by the positions of points P1 and P3, it is clear that the error E2 occurred during the transition of the x axis signal from its maximum or near maximum positive value at the preceding point P1 to its most negative or near most negative value at the succeeding point P3. Obviously in the excursion from the most positive value to the most negative value, the x value had to pass through zero, the E2 error occurring because the sampling was late whereby the x signal was sampled after it had already started through zero toward its most negative value. Thus an advance of timing is called for. Conversely, if E2 had been in the opposite direction, this would suggest that the timing was early and that an incremental delay in timing was called for, the direction of the increment therefore being dependent upon the sign of E2 (clockwise being taken as positive and counterclockwise being taken as negative.) A similar analysis will show that the same result is achieved if the points P1, P2 and P3 are similarly ordered in a counterclockwise fashion, rather than a clockwise fashion as shown in FIG. 5, i.e., if P1 and P2 are both 270°. Because the effective direction of rotation of the points is reversed, however, the sign of the correction must be reversed as shown in FIG. 6.

It is clear from the above that timing error corrections may be readily made when Q1=Q2=90° or Q1=Q2=270° for 3 successive points. However, given the statistical reoccurrence of these two conditions, i.e., two out of 16 possibilities or 12½% of the time for randomly distributed data, one would like to correct for timing errors on a more frequent basis. This may be done by noting that the inpulse shape obtained because of the frequency filtering (as is done with the filters of the present invention) in 212a data sets is such to minimize intersymbol interference. The ideal sample point is at the zero crossing of the previous and subsequential pulses. If the sample point is not ideal, the error is a function of the intersymbol interference caused by the adjacent impulse. The impulse does continue after the adjacent sample points but becomes of insufficient strength for reliable use in timing corrections in that noise, zero offsets and other factors either interfere with or undesirably time displace the sensing of the zero crossing. Thus, if three successive points P1, P2 and P3 are all at the same position or are distributed on the same axis, say the x axis, the phase error E2 for the second data point will be the y excursion caused to some extent by pulses on the y channel occurring prior to point P1 or after point P3, but more dominantly will be comprised of noise, offsets in the y channel, lack of ideal pulse shaping, etc. Consequently the four points corresponding to the four combinations of zero and 180 for Q1 and Q2 in the table of FIG. 6 have no timing corrections. Finally, if one looks at a signal constellations giving Q1=90° and Q2=270°, or Q1=270° and Q2=90°, it will be seen that these signal constellations effectively include a 90° movement between P1 and P2 with a retrace of that movement for P3, so that points P1 and P3 lie substantially on top of each other. In this case the shape of the signal curve on the axis giving rise to the E2 phase difference will be a saddle shaped curve or an inverted saddle shaped curve. While substantial timing errors can readily be detected from such curves, the direction or sign of the timing error cannot, as the curves are symmetrical about the ideal timing point. Accordingly, no timing correction is made on these conditions, either.

Using the carrier phase and timing correction method hereinabove described, the data set of the present invention will readily lock on to the carrier of the signal being received during the initialization process normally carried out in the initial handshake between two data sets, and remain locked during data transmission. During the initialization process, locking may occur not on the coordinate system shown in FIG. 2, but instead at an inclination of 45 degrees with respect thereto. With this orientation, a 9 point constellation is obtained containing four on axis points similar to the points of FIG. 2, four additional points substantially at 45 degrees with respect thereto, and a point at the origin. Such a condition is readily detected under program control which, when detected, results in a step change to disturb the system for locking into the proper condition.

The transmitting portion of a typical data set may also be seen in FIG. 3. Microprocessor 65a provides an eight bit binary signal on port D representing a shaped pulse which is converted to an analog signal by the digital to analog converter 122. The output of the converter is filtered by amplifier 124, coupled as a low pass filter to provide a smooth wave form to the line filter 88 portion of IC 68b. The output of the line filter (a switched capacitor filter) is filtered by amplifier 126, also coupled as a low pass filter, and for the positions shown for switches 72, 74, 80 and 82 is further filtered by the second order notch filter connection of amplifier 76 and buffered by amplifier 128 to provide the 212 XMT output signal on the J1 connector.

The shaped pulse output of port D of microprocessor 65a of course represents the coded and modulated output signal of the transmit side of the data unit as determined by the base band data stream provided on the J1 connector as the 212 TXD signal. Thus the coding, sampling, some wave shaping and modulation is effectively done under program control without requiring additional samplers, modulators, etc.

There has been described herein a new and unique full duplex modem which has been realized to a substantial extent in integrated circuit form and which is operable under microprocessor control for both carrier and timing recovery. In this form, particularly low cost and small full duplex modems have been realized which are compatible with personal computers and will expand the communications capability thereof to systems normally reserved for main frames and data terminals therefor. The special integrated circuits used with the present invention merely use existing technology and known techniques to realize the various circuits shown in FIG. 4. By way of example, integrated circuit switched capacitor filters may readily be obtained from custom IC vendors upon specification of the desired characteristics thereof. Filters of this general type have previously been utilized in commercially available products such as, by way of example, frequency shift keyed modems manufactured by the assignee of the present invention. Such filters are described in various publications including a paper entitled "MOS Sampled Data Switched Capacitor Recursive Filters Using State Variable Techniques", a paper presented at the International Conference on Circuits and Systems in Phoenix, Ariz. in Mar., 1977. Similarly, the other circuits of FIG. 4 are also conventional circuits realizable in integrated circuit form in a number of ways depending upon the choice of the particular designer. With respect to the operating programs for the microprocessor 65a and 65b of FIG. 3, a print out of those programs is attached hereto as Exhibits A and B respectively.

Obviously, while the invention has been disclosed and described with respect to a specific preferred embodiment thereof, it will be understood by those skilled in the art that various changes in form and detail may be made therein without departing from the spirit and scope of the invention.

I claim:

1. A receiver for quadrature amplitude modulated signals comprising
    a line filter means for coupling to a phone line, said line filter means being for means to providing an output responsive to signals on the phone line within the frequency range of a quadrature amplitude modulated signal to be received on the phone line
    first and second demodulation means coupled to said line filter means and operative on inphase and quadrature reference signals to provide first and second demodulator outputs in response thereto
    first and second post demodulation filter means coupled to said first and second demodulator outputs respectively, for providing post demodulation filter outputs containing substantially reduced frequency components in the demodulator outputs above the frequency range of the desired detected signal
    first and second automatic gain control means coupled to said first and second post demodulation filter means respectively for providing first and second AGC output signals of approximately predetermined amplitudes irrespective of variations in the amplitude of the outputs of said first and second post demodulation filters, and
    output means coupled to said first and second automatic gain control means for sampling said first and second AGC output signals at a signaling rate and converting said sampled signals to digital signals.

2. The receiver of claim 1 wherein said first and second post demodulation filters comprise, at least in part, switched capacitor filters.

3. The receiver of claim 1 wherein said line filter comprises, at least in part, a switched capacitor filter.

4. The receiver of claim 1 further comprised of carrier recovery means coupled to said output means, said carrier recovery means being a means responsive to said sampled signals to provide said inphase and quadrature reference signals to said first and second demodulation means in synchronism with the carrier of a received signal.

5. The receiver of claim 4 wherein said carrier recovery means includes phase error detection means responsive to said sampled signals for providing incremental phase correction to said inphase and quadrature reference signals.

6. The receiver of claim 5 wherein each said incremental phase correction is of a predetermined magnitude.

7. The receiver of claim 6 wherein said phase error detection means is a means for providing incremental phase correction to said inphase and quadrature reference signals at the signaling rate.

8. The receiver of claim 7 wherein said phase error detection means is a digital means operating under program control.

9. The receiver of claim 1 wherein said output means includes timing means for timing the sampling of said first and second AGC output signals, and timing error correction means for providing a timing correction to said timing means, said timing error correction means being responsive to specific signaling sequences to provide said timing correction.

10. The receiver of claim 1 wherein said output means includes timing means for timing the sampling of said first and second AGC output signals, and timing error correction means for providing a timing correction to said timing means, said timing error correction means being responsive to specific signaling sequences to provide said timing correction,
wherein said timing error correction means is a means for providing a timing correction to said timing means based upon the phase error of one pair of said sampled signals if three successive pairs of sampled signals consisting of the immediately preceeding pair of sampled signals, said one pair of said sampled signals and the next following pair of said sampled signals comprise one of said specific signaling sequences.

11. The receiver of claim 10 wherein said specific signaling sequences include said three successive pairs of sampled signals which, when plotted as three successive data points on a signal constellation diagram, are separated from each other such that the phase angle from the first data point to the second data point and the phase angle from the second data point to the third data point are either both +90 degrees or are both +270 degrees.

12. The receiver of claim 11 wherein said specific signaling sequences further include all other signaling sequences except signaling sequences wherein said three successive pairs of sampled signals, when plotted as three successive data points on a signal constellation diagram, are distributed so that all three data points are disposed on one axis or diametrical line, or the first and third data points are at substantially the same position.

13. The receiver of claim 12 wherein each said timing correction is of a predetermined magnitude.

14. The receiver of claim 12 wherein said timing means is a digital timing means operating under program control.

15. The receiver of claim 1, wherein inphase and quadrature demodulated signals are both sampled at the signaling rate of a signal being received, further comprising
timing means for timing the sampling of said inphase and quadrature demodulated signals to provide sampled demodulated signals at the signaling rate, and
timing error correction means for providing a timing correction to said timing means, said timing error correction means being responsive to specific signaling sequences in said sampled demodulated signals to provide said timing correction.

16. The apparatus of claim 15 wherein said timing error correction means is a means for providing a timing correction to said timing means based upon the phase error of one pair of said sampled signals if three successive pairs of sampled signals consisting of the immediately preceeding pair of sampled signals, said one pair of said sampled signals and the next following pair of said sampled signals comprise one of said specific signaling sequences.

17. In a receiver for quadrature amplitude modulated signals wherein inphase and quadrature demodulated signals are both sampled at a signaling rate, apparatus for controlling the timing of the sampling comprising
timing means for timing the sampling of said inphase and quadrature demodulated signals, and
timing error correction means for providing a timing correction to said timing means, said timing error correction means being responsive to specific signaling sequences to provide said timing correction
wherein said timing error correction means is a means for providing a timing correction to said timing means based upon the phase error of one pair of said sampled signals if three successive pairs of sampled signals consisting of the immediately preceeding pair of sampled signals, said one pair of said sampled signals and the next following pair of said sampled signals comprise one of said specific signaling sequences, and wherein said specific signaling sequences include said three successive pairs of sampled signals which, when plotted as three successive data points on a signal constellation diagram, are separated from each other such that the phase angle from the first data point to the second data point and the phase angle from the second data point to the third data point are either both +90 degrees or are both +270 degrees.

18. The apparatus of claim 17 wherein said specific signaling sequences further include all other signaling sequences except signaling sequences wherein said three successive pairs of sampled signals, when plotted as three successive data points on a signal constellation diagram, are distributed so that all three data points are disposed on one axis or diametrical line, or the first and third data points are at substantially the same position.

19. The apparatus of claim 18 wherein each said timing correction is of a predetermined magnitude.

20. The receiver of claim 18 wherein said timing means is a digital timing means operating under program control.

21. A method of making sampler timing error corrections in a quadrature amplitude modulated signal receiver wherein inphase and quadrature demodulated signals are provided comprising the steps of
(a) sampling said inphase and said quadrature demodulated signal at a signaling rate
(b) for each successive pair of sampled signals, determining the phase error
(c) testing each successive pair of sampled signals to determine if three successive pairs of sampled signals comprise one of a predetermined group of specific signaling sequences
(d) providing a timing error correction to adjust the timing of the sampler based upon the phase error of a pair of sampled signals as determined in step (b) if that pair of sampled signals, taken together with the next preceeding and the next succeeding pair of sampled signals comprise one of the predetermined group of specific signaling sequences as determined in step (c).

22. A method of making sampler timing error corrections in a quadrature amplitude modulated signal receiver wherein inphase and quadrature demodulated signals are provided comprising the steps of
  (a) sampling said inphase and said quadrature demodulated signal at a signaling rate
  (b) for each successive pair of sampled signals, determining the phase error
  (c) testing each successive pair of sampled signals to determine if three successive pairs of sampled signals comprise one of a predetermined group of specific signaling sequences
  (d) providing a timing error correction to adjust the timing of the sampler based upon the phase error of a pair of sampled signals as determined in step (b) if that pair of sampled signals, taken together with the next preceeding pair of sampled signals comprise one of the predetermined group of specific signaling sequences as determined in step (c), wherein some of the predetermined group of specific signaling sequences comprise three successive pairs of sampled signals which, when plotted as three successive data points on a signal constellation diagram, are separated from each other such that the phase angle from the first data point to the second data point and the phase angle from the second data point to the third data point are either both +90 degrees or are both +270 degrees.

23. The method of claim 22 wherein said specific signaling sequences further include all other signaling sequences except signaling sequences wherein said three successive pairs of sampled signals, when plotted as three successive data points on a signal constellation diagram, are distributed so that all three data points are disposed on one axis or diametrical line, or the first and third data points are at substantially the same position.

24. In a receiver for quadrature amplitude modulated signals, the improvement comprising:
  sampling means for sampling inphase and quadrature demodulated signals at a signaling rate to provide sampled signal pairs at the sampling rate,
  microcomputer means, including a program storage means for storing an operating program therefor,
  means for converting each sampled signal pair to a form compatible for input to said microcomputer means and for presenting said converted signals thereto,
  said microcomputer means being operative under program control to provide timing signals to said sampling means at said signaling rate, and further being operative under program control to cause timing error correction to said timing signals responsive to specific signaling sequences in said signal sample pairs.

25. The improvement of claim 24 wherein said timing error correction is based upon the phase error of one pair of said sampled signals if three successive pairs of sampled signals consisting of the immediately preceeding pair of sampled signals, said one pair of said sampled signals and the next following pair of said sampled signals comprise one of said specific signaling sequences.

26. In a receiver for quadrature amplitude modulated signals, the improvement comprising:
  sampling means for sampling inphase and quadrature demodulated signals at a signaling rate to provide sampled signal pairs at the sampling rate,
  microcomputer means, including a program storage means for storing an operating program therefor,
  means for converting each sampled signal pair to a form compatible for input to said microcomputer means and for presenting said converted signals thereto,
  said microcomputer means being operative under program control to provide timing signals to said sampling means at said signaling rate, and further being operative under program control to cause timing error correction to said timing signals responsive to specific signaling sequences in said signal sample pairs,
  wherein said timing error correction is based upon the phase error of one pair of said sampled signals if three successive pairs of sample signals consisting of the immediately preceeding pair of sampled signals, said one pair of said sampled signals and the next following pair of said sampled signals comprise one of said specific signaling sequences, and
  wherein said specific signaling sequences include said three successive pairs of sampled signals which, if plotted as three successive data points on a signal constellation diagram, would be separated from each other such that the phase angle from the first data point to the second data point and the phase angle from the second data point to the third data point are either both +90 degrees or are both +270 degrees.

27. The receiver of claim 26 wherein said specific signaling sequences further include all other signaling sequences except signaling sequences wherein said three successive pairs of sampled signals, when plotted as three successive data points on a signal constellation diagram, are distributed so that all three data points are disposed on one axis or diametrical line, or the first and third data points are at substantially the same position.

28. A receiver for quadrature amplitude modulated signals comprising
  a line filter means for coupling to a phone line, said line filter means being for means to providing an output responsive to signals on the phone line within the frequency range of a quadrature amplitude modulated signal to be received on the phone line,
  first and second demodulation means coupled to said line filter means and operative on inphase and quadrature reference signals to provide first and second demodulator outputs in response thereto,
  first and second post demodulation filter means coupled to said first and second demodulator outputs respectively, for providing first and second post demodulation filter outputs containing substantially reduced frequency components in the demodulator outputs above the frequency range of the desired detected signal,
  first and second sampling means coupled to said first and second post demodulation filter means respectively for sampling said first and second post demodulation filter outputs at a signaling rate,
  first and second automatic gain control means coupled to said first and second sampling means respectively for providing first and second AGC output signals of approximately predetermined amplitudes irrespective of variations in the amplitude of the outputs of said first and second sampling means, and decoding means coupled to said first and second automatic ain control means for converting said first and second AGC output signals to digital signals.

* * * * *

UNITED STATES PATENT AND TRADEMARK OFFICE
CERTIFICATE OF CORRECTION

PATENT NO. : 4,455,663
DATED : June 19, 1984
INVENTOR(S) : Ragsdale

It is certified that error appears in the above-identified patent and that said Letters Patent is hereby corrected as shown below:

| COLUMN | LINE | DESCRIPTION |
|---|---|---|
| 05 | 29 | delete "Apple-CAT CAT II" insert --Apple-CAT II, "Apple"-- |
| 12 | 12 | delete "providing" insert --provide-- |

Signed and Sealed this

Fifteenth Day of November, 1988

Attest:

DONALD J. QUIGG

Attesting Officer

Commissioner of Patents and Trademarks